(12) United States Patent
Honjo et al.

(10) Patent No.: US 10,712,236 B2
(45) Date of Patent: Jul. 14, 2020

(54) CONDITION DIAGNOSING SYSTEM FOR ROLLING GUIDE DEVICE

(71) Applicant: THK CO., LTD., Tokyo (JP)

(72) Inventors: Yoshiyuki Honjo, Tokyo (JP); Shuhei Yamanaka, Tokyo (JP)

(73) Assignee: THK CO., LTD., Tokyo (JP)

(*) Notice: Subject to any disclaimer, the term of this patent is extended or adjusted under 35 U.S.C. 154(b) by 0 days.

(21) Appl. No.: 16/344,433

(22) PCT Filed: Oct. 19, 2017

(86) PCT No.: PCT/JP2017/037792
§ 371 (c)(1),
(2) Date: Apr. 24, 2019

(87) PCT Pub. No.: WO2018/092498
PCT Pub. Date: May 24, 2018

(65) Prior Publication Data
US 2020/0056961 A1     Feb. 20, 2020

(30) Foreign Application Priority Data
Nov. 21, 2016  (JP) .................................. 2016-225940

(51) Int. Cl.
*F16C 29/06*     (2006.01)
*G01M 13/04*     (2019.01)

(52) U.S. Cl.
CPC ........... *G01M 13/04* (2013.01); *F16C 29/064* (2013.01); *F16C 2233/00* (2013.01)

(58) Field of Classification Search
CPC .... F16C 29/06; F16C 29/0638; F16C 29/064; F16C 29/0642; F16C 29/0645;
(Continued)

(56) References Cited

U.S. PATENT DOCUMENTS

| 7,555,953 B2* | 7/2009 | Yoshioka | ............... F16C 29/00 73/587 |
| 2008/0065354 A1 | 3/2008 | Yoshioka et al. | |
| 2009/0205425 A1 | 8/2009 | Honjo | |

FOREIGN PATENT DOCUMENTS

| JP | 2004-93256 A | 3/2004 |
| JP | 2006-17291 A | 1/2006 |

(Continued)

OTHER PUBLICATIONS

International Search Report dated Jan. 23, 2018, issued in counterpart International Application No. PCT/JP2017/037792 (2 pages).
(Continued)

*Primary Examiner* — Phillip A Johnson
(74) *Attorney, Agent, or Firm* — Westerman, Hattori, Daniels & Adrian, LLP

(57) ABSTRACT

Provided is a state diagnosis system, which is applied to a rolling guide device in which a moving member including an endless circulation path for rolling elements is freely movable along a track member, and which is configured to appropriately recognize a state of a rolling surface of the track member. The state diagnosis system includes: a sensor configured to detect a physical quantity exhibited when the moving member is moving along the track member; a signal processing unit configured to process an output signal from the sensor to output analysis data; and a determination processing unit configured to compare the analysis data with threshold value data to determine whether or not the rolling guide device has an abnormality. Further, when a cycle at which each of the rolling elements, which moves back and forth in the endless circulation path, enters a loadpath from a no-loadpath is represented by t, a data collection time period T, for which the signal processing unit takes in the output signal from the sensor, is set to satisfy T≥t.

4 Claims, 4 Drawing Sheets

(58) Field of Classification Search
CPC .............. F16C 29/0647; F16C 29/0652; F16C 29/0657; F16C 29/0659; F16C 29/0661; F16C 29/0664; F16C 29/0669; F16C 29/0671; F16C 2233/00; G01M 13/04; G01M 13/045
See application file for complete search history.

(56) References Cited

FOREIGN PATENT DOCUMENTS

| JP | 2011-252753 A | 12/2011 |
| JP | 2013-7615 A | 1/2013 |
| WO | 2006/025404 A1 | 3/2006 |
| WO | 2007/099730 A1 | 9/2007 |
| WO | 2017/163875 A1 | 9/2017 |

OTHER PUBLICATIONS

Ohta et al., "Progress in Research on Sound and Vibration of Linear Bearings", Journal of Japanese Society of Tribologists, (Nov. 15, 2013), vol. 58, No. 11, pp. 27-32. Cited in ISR. (8 pages).
Shimizu et al., "Life Distribution and Reliability for Linear Bearings in Case of Roller Guide", Journal of the Japan Society for Precision Engineering, (2007), vol. 73, No. 6, pp. 693-698. Cited in ISR, with Partial Translation. (6 pages).

\* cited by examiner

CONDITION DIAGNOSING SYSTEM FOR ROLLING GUIDE DEVICE

TECHNICAL FIELD

The present invention relates to a state diagnosis system, which is applied to a rolling guide device to be used in a linear guide portion or a curved guide portion of industrial machines such as machine tools or various conveying devices, and diagnoses whether or not the rolling guide device is in a state of being capable of executing its original performance.

BACKGROUND ART

Hitherto, a rolling guide device of this type includes a track member and a moving member. The track member has a rolling surface for rolling elements, which extends along a longitudinal direction of the track member. The moving member is assembled to the track member through intermediation of a plurality of rolling elements which roll on the rolling surface, and is reciprocable along the track member. The moving member has a load rolling surface on which the rolling elements roll while bearing a load. The load rolling surface is opposed to the rolling surface of the track member to define a load path for the rolling elements. Further, the moving member has no-load paths for allowing the rolling elements to circulate from one end to another end of the load path. The load path and the no-load paths are continuous with one another to define an endless circulation path for the rolling elements. With such a configuration, the moving member is movable along the track member without being limited in stroke thereof.

A product lifetime of the rolling guide device mainly depends on fatigue in the rolling surface of the track member or the load rolling surface of the moving member. However, when the rolling surface and the load rolling surface as well as the rolling elements such as balls or rollers which roll thereon are not appropriately lubricated with lubricant or bear excessive loads, flaking of the rolling surface or the load rolling surface may occur early, with the result that the product lifetime of the rolling guide device is shortened. Further, the rolling guide device is applicable to various uses, and the progress of fatigue in the rolling surface or the like is inevitably affected by, for example, a use environment and an applied load depending on the use (hereinafter referred to as "use condition"), such as an environment in which special foreign matters fall onto the track member or a use under an environment of an extremely high or low temperature. Thus, in order to allow the rolling guide device to exert its original performance and fulfill its product lifetime, it is desired that an operation condition of the rolling guide device be continuously detected by various sensors, to thereby allow recognition of the state of the rolling guide device, which is varied from hour to hour, based on the detected contents.

For example, for a rotary bearing, as described in Patent Literature 1, the following diagnosis system is proposed. Specifically, a sensor is used to detect sound, vibration, or acoustic emission generated at the time of a rotational operation of the rotary bearing, and an output signal from the sensor is analyzed. Then, a result of the analysis is compared with predetermined reference data to determine whether the rotary bearing has an abnormality.

CITATION LIST

Patent Literature

[PTL 1] JP 2004-93256 A

DISCLOSURE OF THE INVENTION

Problem to be Solved by the Invention

Regarding a physical quantity such as sound, vibration, or acoustic emission, a signal directly obtained from the sensor is a continuous analog signal, and in order to compare the analog signal with the predetermined reference data to determine whether or not there is an abnormality, it is required to convert the analog signal into a discrete digital signal. Data collection conditions in this case, such as a sampling cycle and a time period of measurement, are appropriately set in accordance with an operation speed of the rotary bearing and a resonance frequency of a machine.

However, in the rolling guide device described above, the endless circulation path for the rolling elements includes the load path and the no-load paths, and hence, even when the moving member is normally running along the track member, a signal changes every time the rolling element enters or exits the load path. Thus, a detection signal from the sensor cannot be processed in the same manner as in the diagnosis system for a rotary bearing of Patent Literature 1.

Means for Solving the Problems

The present invention has been made in view of the above-mentioned subject, and has an object to provide a state diagnosis system capable of appropriately recognizing a state of a rolling surface of a track member of a rolling guide device through use of a sensor mounted to the rolling guide device.

That is, one embodiment of the present invention relates to a state diagnosis system for a rolling guide device, the rolling guide device including: a plurality of rolling elements; a track member having a rolling surface for the rolling elements, the rolling surface extending along a longitudinal direction of the track member; and a moving member, which is assembled to the track member through intermediation of the rolling elements, and which includes an endless circulation path for the rolling elements, the endless circulation path including a load path for the rolling elements and no-load paths for coupling both ends of the load path. The state diagnosis system includes: a sensor configured to detect a physical quantity exhibited when the moving member is moving along the track member; a signal processing unit configured to process an output signal from the sensor to output analysis data; and a determination processing unit configured to determine whether the rolling guide device has an abnormality by comparing the analysis data with threshold value data. Further, when a time interval at which each of the rolling elements, which moves back and forth in the endless circulation path, enters the load path from one of the no-load paths is represented by t, a data collection time period T, for which the signal processing unit takes in the output signal from the sensor, is set to satisfy T≥t.

Effects of the Invention

According to one embodiment of the present invention, the output signal from the sensor taken in by the signal processing unit within the data collection time period always contains a waveform corresponding to impactive vibration generated when the rolling element enters the load path. Thus, through comparison of the analysis data obtained by processing the output signal with the threshold value data, it is possible to appropriately recognize whether or not a running state of the moving member of the rolling guide device relative to the track member thereof is appropriate. In other words, it is possible to appropriately recognize a state of the rolling surface of the track member and a lubrication state of the rolling elements.

BRIEF DESCRIPTION OF DRAWINGS

FIGS. 4(a)-4(b) are each a graph for showing an example of an output signal from a vibration sensor, in which FIG. 4(a) is a graph for showing the output signal exhibited when an operation of the rolling guide device is normal, and FIG. 4(b) is a graph for showing the output signal exhibited when a trouble has occurred in the operation of the rolling guide device.

MODE FOR CARRYING OUT THE INVENTION

Now, detailed description is made of a state diagnosis system for a rolling guide device according to one embodiment of the present invention with reference to the accompanying drawings.

Figure 1:
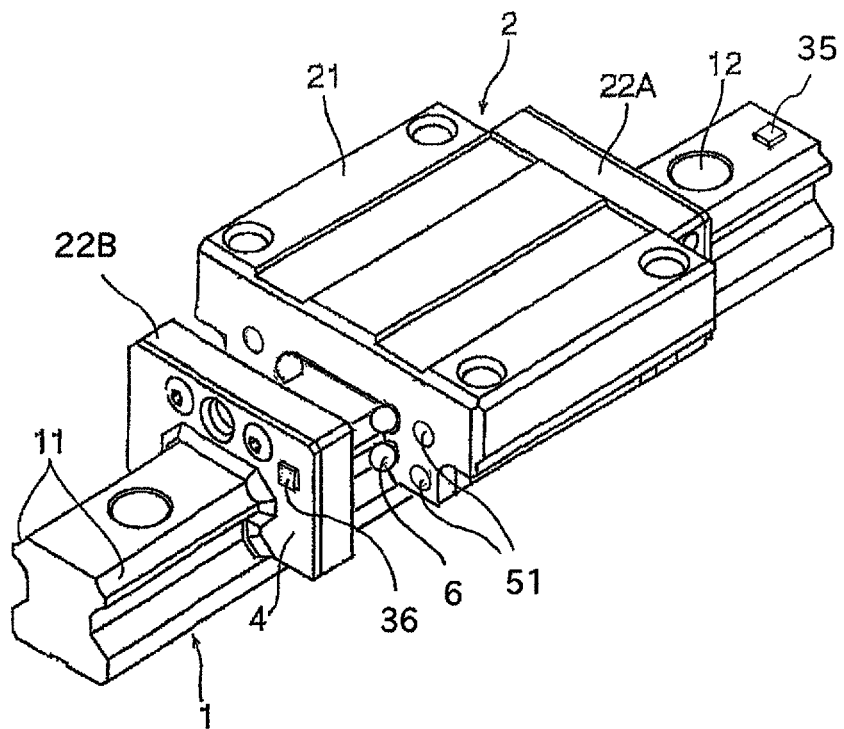
FIG. 1 is a perspective view for illustrating a rolling guide device in a first embodiment to which the present invention is applicable.

FIG. 1 is a perspective view for illustrating an example of a rolling guide device to which the present invention is applied. The rolling guide device includes a track member 1 and a moving member 2. The track member 1 extends linearly. The moving member 2 is assembled to the track member 1 through intermediation of a plurality of balls being rolling elements. The track member 1 is laid on a fixed portion of various machine tools, and a movable body of a type among various types is mounted to the moving member 2, thereby being capable of guiding the movable body along the track member 1 in a freely reciprocable manner.

The track member 1 is formed into an elongated body having a substantially rectangular cross section. The track member 1 has a plurality of bolt mounting holes 12, which are formed at predetermined intervals in a longitudinal direction and each penetrate from an upper surface to a bottom surface. With use of fixing bolts inserted into the bolt mounting holes 12, the track member 1 can be rigidly fixed to a fixing portion. On both right and left side surfaces of the track member 1, there are formed two rolling surfaces 11 for the rolling elements. The track member has four rolling surfaces 11 as a whole. The number of rolling surfaces 11 formed on the track member 1 is not limited to four.

Meanwhile, the moving member 2 mainly includes a main body member 21 made of metal, and a pair of covers 22A and 22B made of synthetic resin. The pair of covers 22A and 22B are mounted to both ends of the main body member 21 in a moving direction of the main body member 21. The moving member 2 has a plurality of endless circulation paths for the balls so as to correspond to the rolling surfaces 11 of the track member 1. Further, seal members 4, which are configured to seal gaps between the moving member 2 and the track member 1, are fixed to the covers 22A and 22B, thereby preventing dust or the like adhering to the track member 1 from entering the endless circulation paths. FIG. 1 is an illustration of a disassembled state in which one cover 22B of the pair of covers 22A and 22B mounted to the main body member 21 is removed from the main body member 21.

Figure 2:
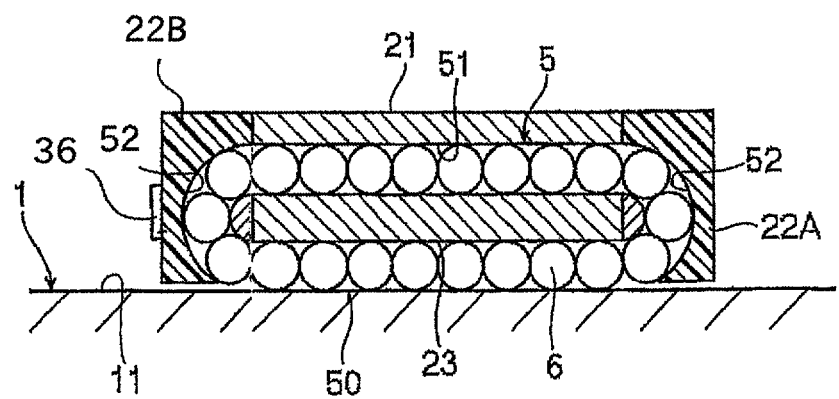
FIG. 2 is a sectional view for illustrating a configuration of an endless circulation path for balls.

FIG. 2 is a sectional view for illustrating the endless circulation path. As illustrated in FIG. 2, the endless circulation path 5 includes a load path 50, a return path 51, and a pair of direction change paths 52. The main body member 21 forming the moving member 2 has a load rolling surface 23 opposed to the rolling surface 11 of the track member 1, and the rolling elements 6 roll while bearing a load between the rolling surface 11 of the track member 1 and the load rolling surface 23 of the main body 21. In the endless circulation path 5, a path portion in which the rolling elements 6 roll while bearing the load corresponds to the load path 50. Further, the main body member 21 has the return path 51 extending parallel to the load path 50. Typically, the return path 51 is formed so as to penetrate through the main body member 21, and an inner diameter of the return path 51 is set so as to be slightly larger than a diameter of the rolling elements 6. With such a configuration, the rolling elements 6 roll in the return path without bearing the load.

The direction change paths 52 are formed in the pair of covers 22A and 22B, respectively. Those covers 22A and 22B are fixed to end surfaces of the main body member 21 so as to sandwich the main body member 21. The direction change path 52 of each of the covers 22A and 223 connects an end portion of the load path 50 and an end portion of the return path 51 to each other, and allows the rolling elements 6 to move therebetween.

Thus, when the pair of covers 22A and 22B are fixed to the main body member 21, the endless circulation path 5 for the rolling elements 6 is brought to completion. In the endless circulation path 5, the rolling elements 6 roll while bearing the load only in the load path 50 defined by the load rolling surface 23 of the main body member 21 and the rolling surface 11 of the track member 1, which are opposed to each other. Meanwhile, in the return path 51 and the direction change paths 52, the rolling elements do not bear the load, and the return path 51 and the direction change paths 52 form no-load paths.

In the rolling guide device in the embodiment described with reference to the drawings, the balls are used as the rolling elements 6. However, the present invention is also applicable to a rolling guide device using rollers.

As illustrated in FIG. 1, a vibration sensor 35 is fixed to an end portion of the track member 1 in a longitudinal direction thereof. An acceleration sensor can be used as the vibration sensor 35. The vibration sensor 35 is configured to detect vibration generated when the moving member and the track member move relative to each other, and the vibration sensor 35 may be fixed to, for example, the main body member of the moving member instead of being fixed to the track member.

Meanwhile, a proximity sensor 36 is fixed to an outer side of the cover 22B. The proximity sensor 36 is fixed to the cover at a position of overlapping with the direction change path 52 formed in the cover 22B, and is configured to detect passage of each of the rolling elements 6 in the direction change path 52. The cover 22B is made of synthetic resin, and the rolling elements 6 are each made of metal. Therefore, through use of an induction-type or a capacitance-type proximity sensor, presence of the rolling elements 6 can be detected. In the example illustrated in FIG. 1, the proximity sensor 36 is provided so as to correspond to only one location among four locations of the direction change paths 52, which are formed in the cover 22B. However, a plurality of proximity sensors 36 may be provided so as to correspond to the respective direction change paths 52.

Figure 3:
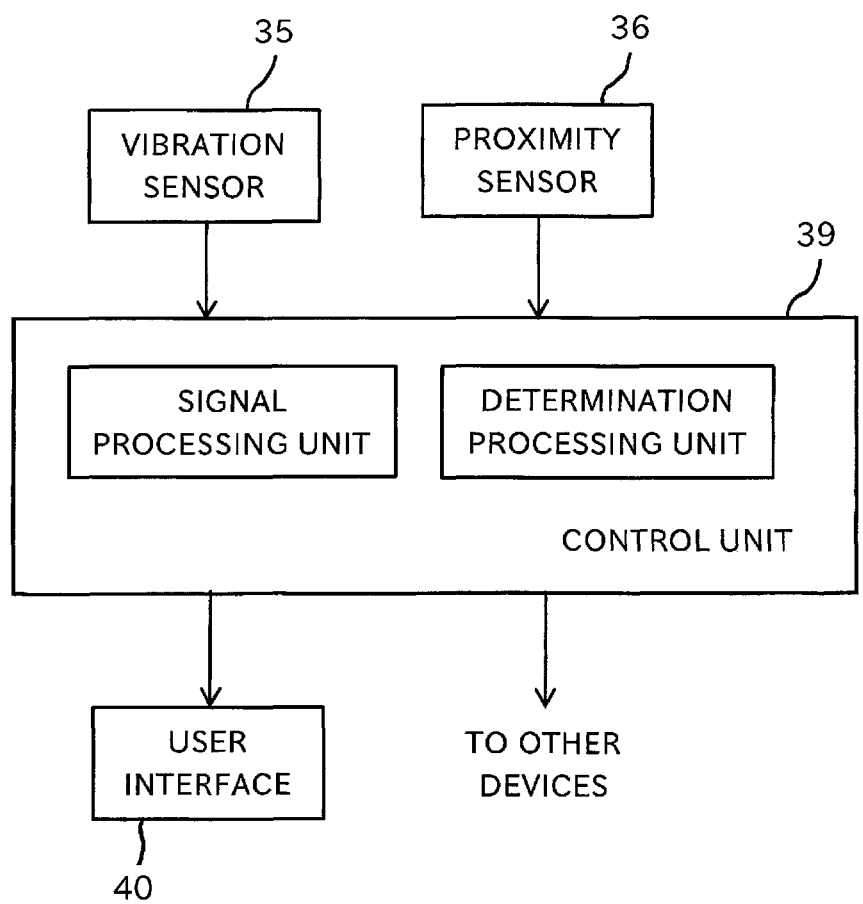
FIG. 3 is a block diagram for illustrating an example of a configuration of the state diagnosis system according to the present invention.

FIG. 3 is a block diagram for illustrating a configuration of a state diagnosis system for the rolling guide device using the vibration sensor 35 and the proximity sensor 36. Output signals from the vibration sensor 35 and the proximity sensor 36 are input to a control unit 39 through, for example, an A/D converter. The control unit 39 is implemented by a microcontroller including a RAM and a ROM. The control unit 39 executes a diagnosis program stored in advance in the ROM, and outputs a determination signal in accordance with a result of the diagnosis. The determination signal output by the control unit 39 is output to an alarm device or a user interface 40 such as a display.

Figure 4:
Figure 4:

The vibration sensor 35 is configured to detect an amplitude when the moving member 2 moves along the track member 1, and output the amplitude. FIG. 4 are each a graph for schematically showing a waveform of the output signal from the vibration sensor 35, and the horizontal axis indicates time. FIG. 4(*a*) is a graph for showing a waveform of the output signal exhibited when there is no damage to the load rolling surface 23 of the moving member 2 or the rolling surface 11 of the track member 1 and a lubrication state of the rolling elements 6 is normal, that is, when the rolling guide device is operating normally. Meanwhile, FIG. 4(*b*) is a graph for showing a waveform of the output signal exhibited when some damage, for example, flaking, has occurred in the load rolling surface 23 of the moving member 2 or the rolling surface 11 of the track member 1, or the lubrication state of the rolling elements 6 is inappropriate, that is, when some trouble has occurred in the operation of the rolling guide device.

As shown in FIG. 4(*a*), when the rolling guide device is operating normally, changes in vibration having substantially the same level are regularly recorded in the output signal from the vibration sensor 35 at a cycle t. The change in vibration at the cycle t occurs when the rolling element 6 enters the load path 50 from the direction change path 52. It is considered that, when the rolling element 6 enters the load path 50, the rolling element 6 is brought into strong contact with both of the rolling surface 11 of the track member 1 and the load rolling surface 23 of the moving member 2 to enter a state of bearing the load, and vibration is generated at this time. Accordingly, every time each rolling elements 6 enters the load path 50, a large change in vibration is recorded. Meanwhile, when some trouble has occurred in the operation of the rolling guide device, as shown in FIG. 4(*b*), irregular changes in vibration are recorded in a mixed manner in the output signal from the vibration sensor 35, in addition to regular changes in vibration shown in FIG. 4(*a*).

The control unit 39 takes in the output signal from the vibration sensor 35 to process the output signal, to thereby generate analysis data indicating an intensity level of vibration. Further, in the ROM of the control unit 39, threshold value data indicating an intensity level of vibration exhibited when the rolling guide device is operating normally is recorded in advance, and the control unit 39 compares the generated analysis data with the threshold value data read out from the ROM, to thereby determine, based on a result of the comparison, whether or not some trouble has occurred in the operation of the rolling guide device. That is, the signal processing unit and the determination processing unit in the present invention are implemented by the control unit 39.

The control unit 39 takes in an analog signal output from the vibration sensor 35 for a predetermined data collection time period T based on a predetermined sampling frequency. A plurality of instantaneous values that have been taken in during the data collection time period T are subjected to root mean square (RMS) processing, to thereby become analysis data indicating a representative value in the data collection time period T. This analysis data indicates the intensity level of vibration during the data collection time period T. The threshold value data to be compared with the analysis data is generated by the same processing as that for the analysis data under the state in which the rolling guide device is operating normally, for example, in an initial stage in which the track member 1 is laid on the fixed portion of various machine tools, and the generated threshold value data is stored in the ROM of the control unit 39. Accordingly, through comparison of the analysis data with the threshold value data, it is possible to determine whether or not abnormal vibration is contained in running of the moving member 2 on the track member 1.

As shown in FIG. 4(*a*), under the state in which the rolling guide device is operating normally, vibration caused by entrance of the rolling element into the load path is repeatedly generated at the cycle t, and is recorded in the output signal from the vibration sensor. Accordingly, in a case where the data collection time period for taking in the output signal from the vibration sensor is set to be shorter than the cycle t, even when the rolling guide device is operating normally, the magnitude of the intensity level of vibration indicated by the analysis data may extremely differ from that in the cycle t.

Figure 5:
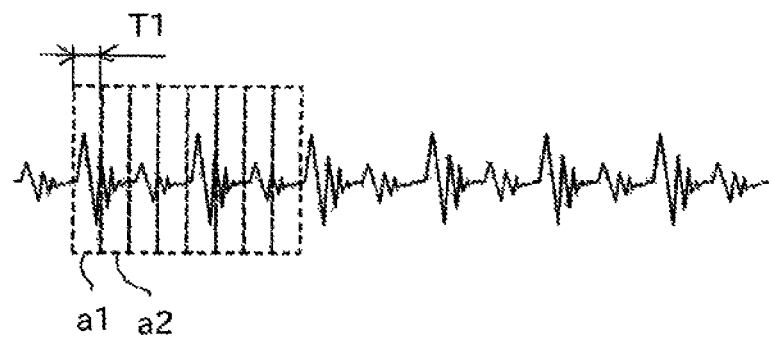
FIG. 5 is a graph for showing a case in which a data collection time period. T1 for the output signal from the vibration sensor is shorter than a cycle t.

For example, as shown in FIG. 5, when a data collection time period T1 shorter than the cycle t is used, between a frame a1 and a frame a2, which have the same data collection time period but have different times to start data collection, the intensity level of vibration indicated by the analysis data differs depending on whether or not vibration generated when the rolling element 6 enters the load path 50 is contained. That is, the analysis data has a large variation depending on the time to start data collection, and hence, even when those pieces of analysis data are compared with the threshold value data, it is impossible to determine whether or not the rolling guide device is operating normally.

In view of the above, in the present invention, the data collection time period T, for which the control unit 39 reads the output signal from the vibration sensor 35, is set to satisfy: where t represents a cycle at which vibration caused by entrance of the rolling elements 6 into the load path 50 is generated.

When the data collection time period T is set in this manner, vibration generated when the rolling element 6 enters the load path 50 is always contained in the data collection time period T. Thus, when the cycle t of generation of vibration caused by entrance of the rolling element 6 into the load path 50 is recognized, it is possible to determine whether or not the rolling guide device is operating normally through comparison of the analysis data with the threshold value data.

As an example of setting the data collection time period T to be equal to or longer than t, it is conceivable to set the data collection time period T as follows.

$$T=nt \text{ (n: natural number)}$$

Figure 6:
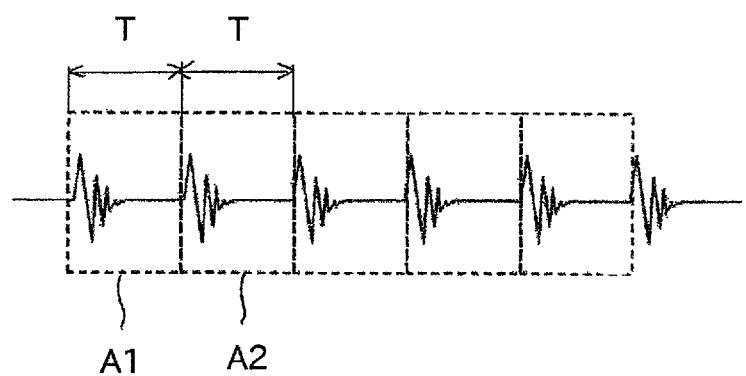
FIG. 6 is a graph for showing a case in which a data collection time period T for the output signal from the vibration sensor is the same as the cycle t, and for showing a case in which the operation of the rolling guide device is normal.

When the case of n=1 is considered, the data collection time period T is equal to t, and as shown in FIG. 6, a frame A1 and a frame A2, which have different times to start data collection, each always contain vibration caused by entrance of the rolling element 6 into the load path 50. Accordingly, under the state in which the rolling guide device is operating normally, respective pieces of analysis data associated with the frame A1 and the frame A2 indicate substantially the same intensity level. The rolling guide device is operating normally in this case, and hence the intensity level at this time is the same as that of the threshold value data.

Figure 7:
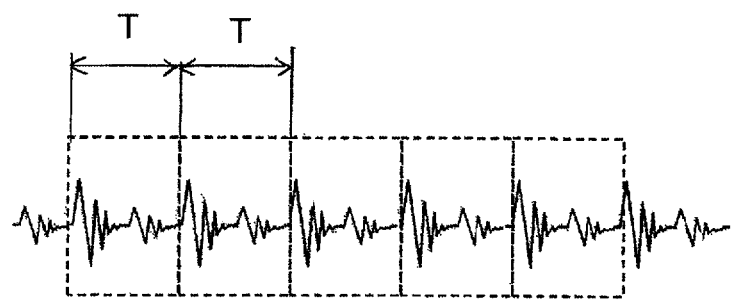
FIG. 7 is a graph for showing a case in which the data collection time period T for the output signal from the vibration sensor is the same as the cycle t, and for showing a case in which a trouble has occurred in the operation of the rolling guide device.

Meanwhile, as shown in FIG. 7, even when some trouble has occurred in the operation of the rolling guide device, the output signal from the vibration sensor 35 is taken in by the control unit 39 under the condition that the data collection time period T is equal to t, and is subjected to the RMS processing to generate analysis data. In this case, the generated analysis data contains, in addition to vibration caused by entrance of the rolling element 6 into the load path 50, vibration caused by abnormal running of the moving member 2 relative to the track member 1, and hence the analysis data indicates an intensity level higher than that of the threshold value data. Accordingly, based on a result of comparison between the analysis data and the threshold value data, it is possible to determine that some trouble has occurred in the rolling guide device.

The control unit 39 compares the analysis data with the threshold value data, and when determining that the analysis data is larger than the threshold value data, outputs to the user interface 40 an alarm indicating that some trouble has occurred in the rolling guide device. The control unit 39 may also output the determination result to a machine tool or other such device using the rolling guide device. Further, the control unit 39 may be configured to compare the analysis data with the threshold value data, and when determining that the analysis data is equal to the threshold value data, output a determination signal indicating that running of the rolling guide device is normal.

In the state diagnosis system according to the present invention, the data collection time period T is set to a period obtained by multiplying the cycle t, at which the rolling element 6 enters the load path 50, by a natural number as described above, and hence it is required to recognize the cycle tin order to implement the diagnosis system. In this embodiment, the proximity sensor 36 detects passage of each of the rolling elements 6 in the direction change paths 52, and hence through checking of the output signal from the proximity sensor, it is possible to recognize an interval of passage between two rolling elements moving back and forth, that is, to recognize the cycle t, at which the rolling element 6 enters the load path 50.

Thus, when the control unit 39 counts the number of passing rolling elements 6 based on a change in the output signal from the proximity sensor 36, it is possible to freely set the length of the data collection time period T, which is obtained by multiplying the cycle t by a natural number, for the control unit 39.

Further, the cycle t is uniquely determined based on a rolling speed of the rolling element 6 in the endless circulation path, that is, the moving speed of the moving member 2 relative to the track member 1, and hence, when the moving speed of the moving member 2 can be recognized by various sensors, it is not required to use the output signal from the proximity sensor 36. For example, a linear scale is provided along the track member 1, and an encoder configured to read the linear scale is provided to the moving member 2. In this case, the moving speed of the moving member 2 is recognized based on an output signal from the encoder, and the cycle t can be recognized based on the moving speed. Further, when the rolling guide device and a ball screw device is combined to construct a guide system, the moving speed of the moving member 2 relative to the track member 1 depends on a rotation speed of a motor configured to drive the ball screw device, and hence the cycle t can be recognized by recognizing the rotation speed of the motor, or by obtaining the moving speed of the moving member 2 from a controller of the guide system, which is configured to control rotation of the motor.

In the present invention, the data collection time period T for the analysis data and the data collection time period T for the threshold value data stored in advance in the control unit 39 are required to be the same. For example, when the collection time period for the analysis data is set to be twice as long as the cycle t (n=2), the collection time period for the threshold value data is also required to be set to be twice as long as the cycle t.

As described above, when a trouble has occurred in the rolling guide device, vibration occurs in the moving member 2 differently from a case in which the rolling guide device is operating normally. However, when a trouble has occurred in the rolling guide device, in addition to a change in vibration of the moving member, various changes in physical quantity occur differently from a case in which the rolling guide device is operating normally, such as a change in running sound generated when the moving member is being moved along the track member or a change in thrust force, or displacement of the moving member on the track member. Accordingly, such changes in physical quantity may be detected by various sensors, and a detection signal from each sensor may be used to implement the state diagnosis in the present invention.

A sensor capable of recognizing a change in physical quantity generated when the moving member 2 and the track member move relative to each other can be used in place of the vibration sensor. Examples of the sensor include a displacement sensor configured to detect a minute displacement of the moving member 2 in a direction orthogonal to the longitudinal direction of the track member 1, a load cell configured to detect a change in thrust force required when the moving member 2 is to be moved at constant speed, an ammeter configured to detect current flowing through the motor configured to drive the ball screw device of the guide system, and a microphone configured to detect a change in sound generated when the moving member 2 is moving along the track member 1.

As described above, in the state diagnosis system for a rolling guide device according to the present invention, vibration of the moving member 2 moving along the track member 1 is detected by the sensor, and based on the output signal from the sensor, it is determined whether or not some trouble has occurred in the rolling guide device. In this case, the data collection time period T, for which the output signal from the sensor is taken in by the control unit 39 serving as the signal processing unit, is set to be equal to or longer than the cycle t, at which the rolling element 6 enters the load path 50. Thus, in consideration of vibration generated when the rolling element 6 enters or exits the load path 50, it is possible to diagnose whether or not a trouble has occurred in the rolling guide device.

With this configuration, it is possible to appropriately determine whether or not some damage, for example, flaking, has occurred in the load rolling surface 23 of the moving member 2 or the rolling surface 11 of the track member 1, or whether or not the lubrication state of the rolling elements 6 is inappropriate. As a result, it is possible to maintain the best state of operations of various industrial machines using the rolling guide device.

The rolling guide device in the embodiment described with reference to the drawings is of a type in which the track member 1 is laid on the fixed portion. However, the present invention is also applicable to a rolling guide device such as a ball-spline device or a ball screw device of a type in which the track member is formed into a rod shaft shape such that only both ends thereof are supported by the fixed portion.

The invention claimed is:

1. A state diagnosis system for a rolling guide device, the rolling guide device including:
    a plurality of rolling elements;
    a track member having a rolling surface for the rolling elements, the rolling surface extending along a longitudinal direction of the track member; and
    a moving member, which is assembled to the track member through intermediation of the rolling elements, and which includes an endless circulation path for the rolling elements, the endless circulation path including a load path for the rolling elements and no-load paths for coupling both ends of the load path,
the state diagnosis system comprising:
    a sensor configured to detect a physical quantity exhibited when the moving member is moving along the track member;
    a signal processing unit configured to process an output signal from the sensor to output analysis data; and
    a determination processing unit configured to determine whether the rolling guide device has an abnormality by comparing the analysis data with threshold value data,
    wherein, when a cycle at which each of the rolling elements, which moves back and forth in the endless circulation path, enters the load path from one of the no-load paths is represented by t, a data collection time period T, for which the signal processing unit takes in the output signal from the sensor, satisfies T≥t.

2. The state diagnosis system for a rolling guide device according to claim 1, wherein the data collection time period T, for which the signal processing unit takes in the output signal from the sensor, satisfies T=nt, where n is a natural number.

3. The state diagnosis system for a rolling guide device according to claim 1, wherein the state diagnosis system is configured to:
    detect a moving speed of the moving member relative to the track member; and
    recognize the cycle t based on a result of the detection.

4. The state diagnosis system for a rolling guide device according to claim 3, wherein the state diagnosis system is configured to:
    detect the rolling elements moving in the endless circulation path through use of a proximity sensor mounted to the moving member; and
    recognize the cycle t based on a result of the detection.

* * * * *